United States Patent [19]
Scheihing et al.
[11] 4,413,470
[45] Nov. 8, 1983

[54] CATALYTIC COMBUSTION SYSTEM FOR A STATIONARY COMBUSTION TURBINE HAVING A TRANSITION DUCT MOUNTED CATALYTIC ELEMENT

[75] Inventors: Paul E. Scheihing, Glen Mills; James A. Laurelli, Springfield, both of Pa.

[73] Assignee: Electric Power Research Institute, Inc., Palo Alto, Calif.

[21] Appl. No.: 240,716

[22] Filed: Mar. 5, 1981

[51] Int. Cl.$^{3}$ .......... F02C 7/20
[52] U.S. Cl. .......... 60/39.32; 60/723
[58] Field of Search .......... 60/723, 299, 322, 39.32, 60/39.37; 422/179, 180, 221, 222; 431/7

[56] References Cited

U.S. PATENT DOCUMENTS

| | | | |
|---|---|---|---|
| 2,592,060 | 4/1952 | Oulianoff | 60/39.37 |
| 2,712,729 | 7/1955 | Wigg | 60/757 |
| 3,702,058 | 11/1972 | De Corso et al. | 60/757 |
| 3,759,038 | 9/1973 | Scalzo et al. | 60/39.32 |
| 3,947,252 | 3/1976 | Musall et al. | 422/179 |
| 4,004,888 | 1/1977 | Musall | 422/179 |
| 4,072,007 | 2/1978 | Sanday | 60/723 |
| 4,101,280 | 7/1978 | Frietzsche et al. | 60/299 |
| 4,155,980 | 5/1979 | Santiago et al. | 422/180 |
| 4,302,932 | 12/1981 | Kuznetsov | 60/39.32 |

OTHER PUBLICATIONS

De Corso et al., "Catalysts for Gas Turbine Combustors", Journal of Engineering for Power, Apr. 1977; pp. 159-163.

*Primary Examiner*—Louis J. Casaregola
*Attorney, Agent, or Firm*—E. F. Possessky

[57] ABSTRACT

A catalytic combustion system includes a combustor having a diffuser end portion supported for sliding thermal growth by a catalytic unit through a spring clip ring assembly. The catalytic unit includes two shell portions which are secured together to support a catalytic element within the shell. A ring supports the catalytic unit on the transition duct for sliding thermal axial growth through a spring ring and receives catalytic element thrust. The parts are structurally arranged for installation and maintenance through an opening in the turbine casing.

11 Claims, 16 Drawing Figures

CATALYTIC COMBUSTION SYSTEM FOR A STATIONARY COMBUSTION TURBINE HAVING A TRANSITION DUCT MOUNTED CATALYTIC ELEMENT

CROSS-REFERENCE TO RELATED APPLICATIONS

W.E. 49,416 entitled CATALYTIC COMBUSTOR HAVING SECONDARY FUEL INJECTION FOR LOW $NO_x$ STATIONARY COMBUSTION TURBINES and filed by P. E. Scheihing et al. concurrently herewith.

W.E. 49,667 entitled CATALYTIC COMBUSTOR HAVING SECONDARY FUEL INJECTION FOR LOW $NO_x$ STATIONARY COMBUSTION TURBINES and filed by P. W. Pillsbury concurrently herewith.

BACKGROUND OF THE INVENTION

The present invention relates to combustion turbines and more particularly to catalytic combustion systems for stationary combustion turbines used for electric power generation and other industrial processes.

Turbine manufacturers and the electric power generation industry have been interested in efficiently implementing the catalytic combustion technology to combustion turbines in order to reduce significantly the generation of pollutant nitrogen oxides ($NO_x$) during turbine operation. Conventional turbine combustion occurs at about 4500° F. with significant $NO_x$ produced by atmospheric nitrogen reactions. Catalytic combustion occurs at about 2500° F. which is too low to promote $NO_x$ production from atmospheric nitrogen.

In order to realize fully the potential antipollution benefits of catalytic combustion, it is desirable that the catalytic combustion system not only be structured for efficient operation in newly manufactured combustion turbines but also for retrofit usage in existing turbines. In retrofit applications, it is normally necessary that the whole combustion system be removed for replacement by a catalytic combustion system; i.e. the conventional combustion baskets and transition ducts would normally be removed.

Thus, there is a need to arrange a catalytic combustion system for ready installation through the casing structure of existing turbines while simultaneously being operable to provide efficient performance. None of the known prior art appears to be directed to providing such product performance.

SUMMARY OF THE INVENTION

A catalytic combustion system for a turbine comprises a catalytic unit supported between a combustor basket and a transition duct to that the thrust load is directed to support means for the transition duct. The structural elements are arranged to facilitate combustion system installation or removal through an opening in the turbine casing.

DESCRIPTION OF THE PREFERRED EMBODIMENT

Figure 1:
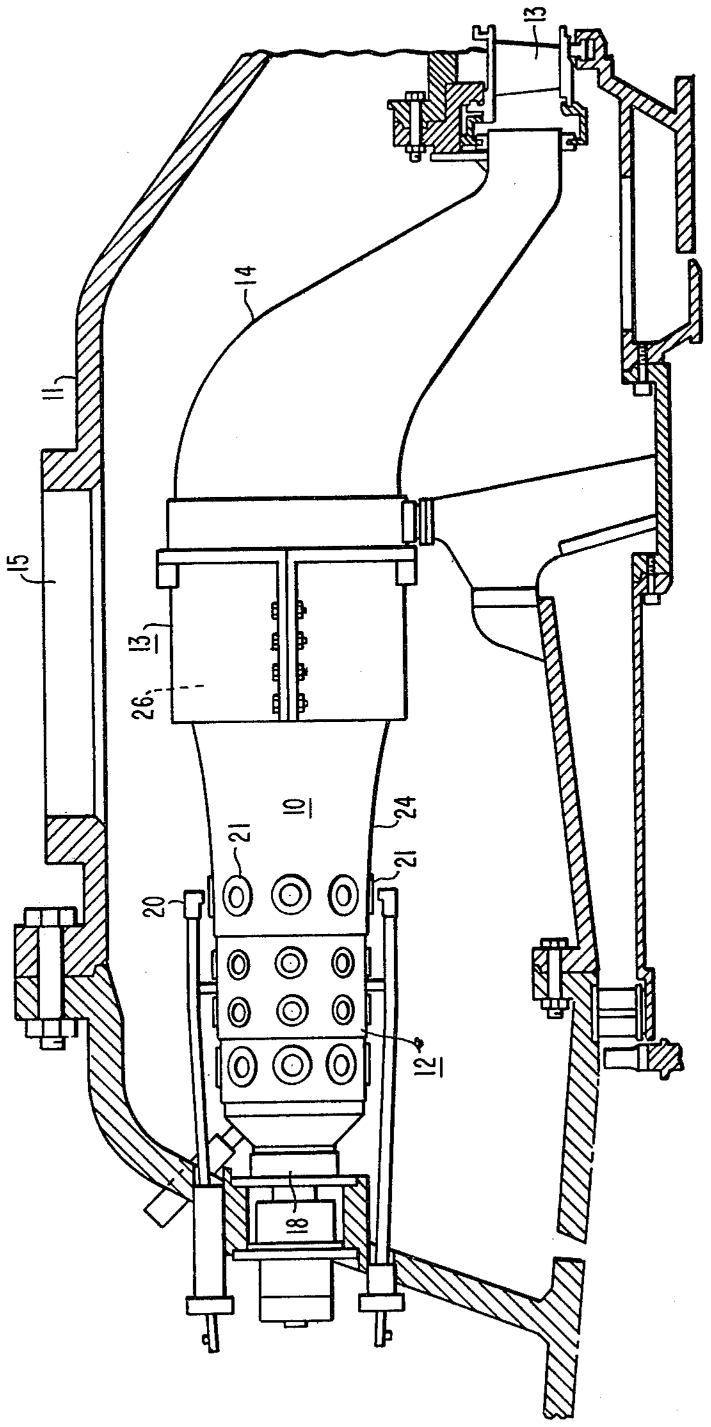
FIG. 1 shows an elevation view of a catalytic combustion system arranged in accordance with the principles of the invention.

More particularly, there is shown in FIG. 1 a catalytic combustion system 10 arranged in accordance with the invention to generate combustion products which pass through stator vanes 13 to drive conventional turbine blades (not shown). A plurality (not shown) of the systems 10 are disposed about the rotor axis within a turbine casing 11 to supply the total hot gas flow needed to drive the turbine.

The catalytic combustion system includes a combustor basket 12, a catalytic unit 13 and a transition duct 14 which directs the hot gas to the annular space through which it passes to be directed against the turbine blades.

The combustor 12 is mounted on the casing 11 and preferably provided with a primary and plural (six) secondary sidewall fuel nozzles 18 and 20. Fuel supplied through the primary nozzle 18 is mixed with primary air and burned in a primary combustion zone to provide hot gas for driving the turbine or for preheating a downstream fuel-air mixture to the level required for catalytic reaction. The supplemental use of the primary burner in the system 10 also enables compensating primary fuel supply increases to be made for dropoff in catalytic activity with operation time. The ratio of conventional combustion to catalytic combustion is sufficient under all operating conditions to achieve the needed combustion assistance without the production of an unacceptable $NO_x$ penalty. A fuller explanation of the combustion operation of the system is presented in the aforementioned copending patent applications.

Gases flow downstream within the basket 12 from the primary combustion zone to the entry to a secondary zone where the secondary fuel nozzles 20 inject fuel preferably with respective surrounding jets of atomizing air through sidewall scoops 21 for mixing with the primary gas flow. The resultant mix expands as it passes through an outwardly flared diffuser 24 which forms an end portion of the basket 16. It then enters a catalytic reaction element 26 in the catalytic unit 13.

The diffuser is employed because a smaller path diameter is needed for satisfactory fuel mixing in the combustor basket is compared to the path diameter needed for satisfactory catalytic combustion. Thus, injection of secondary fuel into a smaller diameter basket yields improved fuel/air mixing and better fuel/air uniformity across the face of the catalyst. On the other hand, the use of a larger basket diameter enables use of a larger catalyst diameter which results in a lower catalyst inlet velocity which yields a lower pressure drop and improved combustion efficiency. The basket 12 in this case has an 11-inch diameter at the dome connection, and a 16-inch diameter at the basket diffuser exit to the catalytic element 16.

To protect the catalyst and the combustor, the system operates so that the residence time for the gaseous mixture (in this case, preheated to 800° F.) in the secondary fuel preparation zone is less than the ignition delay time from the primary zone. In this way, flame is contained in the primary combustion zone away from the catalytic element.

The diameter of the catalytic element 26 is determined mainly by the maximum allowable reference gas velocity for complete emissions burnout at an acceptable pressure loss. Higher gas velocities require longer catalyst beds and result in higher emissions. The mass transfer units required for complete emissions burnout is inversely proportional to the square root of reference velocity in laminar flow, but the effect of reference velocity on the mass transfer rate decreases with an increase in channel Reynolds number. Thus, the maximum allowable reference velocity is limited in turbulent flow by the restriction of pressure losses. However, the low limit boundary of reference velocity for the region of operability may be determined by flashback considerations in the fuel preparation zone.

The catalytic unit 13 includes a can 30 within which a catalytic monolithic honeycomb structure is supported as the element 26. The catalyst characteristics can be as follows:

DATA FOR DXE-442 CATALYST

I. Substrate
- Size—(2″+2″) long-¼″ gap
- Material—Zircon Composite
- Bulk density—40-42 lb./ft.$^3$
- Cell shape—Currugated Sinusoid
  - Number—256 Channels/in.$^2$
  - Hydraulic diameter—0.0384″
- Web thickness—10±2 mils
  - Open Area—65.5%
- Heat capacity—0.17 BTU/lb., °F.
- Thermal expansion coefficient—$2.5\times10^{-6}$ in./in., °F.
- Thermal conductivity—10 BTU, in/hr., ft.$^2$, °F.
- Melting temperature—3050° F.
- Crush strength
  - Axial—800 PSI
  - 90°—25 PSI II. Catalyst
- Active component—Palladium
- Washcoat—Stabilized Alumina The catalytic can 30 is mounted in a clam shell housing 34. Within the can 30, a compliant layer 32 surrounds the monolithic catalytic element 26 to absorb vibrations imposed from external sources.

The transition duct 14 and the combustor basket 12 are connected through a shell housing 34 of the catalytic unit 13. As a result, hot gas flows along a generally sealed path from the diffuser 24, through the catalytic element 26 where catalytic combustion occurs when the hot gas contains a fuel-air mixture, and finally through the transition duct 14 to the turbine blades.

The mounting and the general location of the catalytic unit 13 provide for convenient installation and replacement through turbine casing openings 15. Further, the structural support arrangement provides for thrust loading and thermal expansion during turbine operation.

Figure 10:
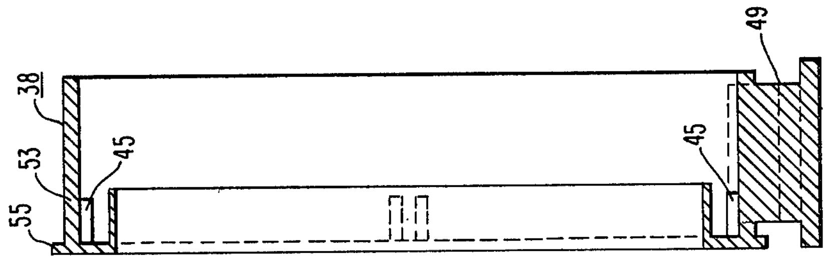
FIGS. 9 and 10 show end and elevational section views of a ring which supports the catalytic unit and transition duct.
Figure 9:
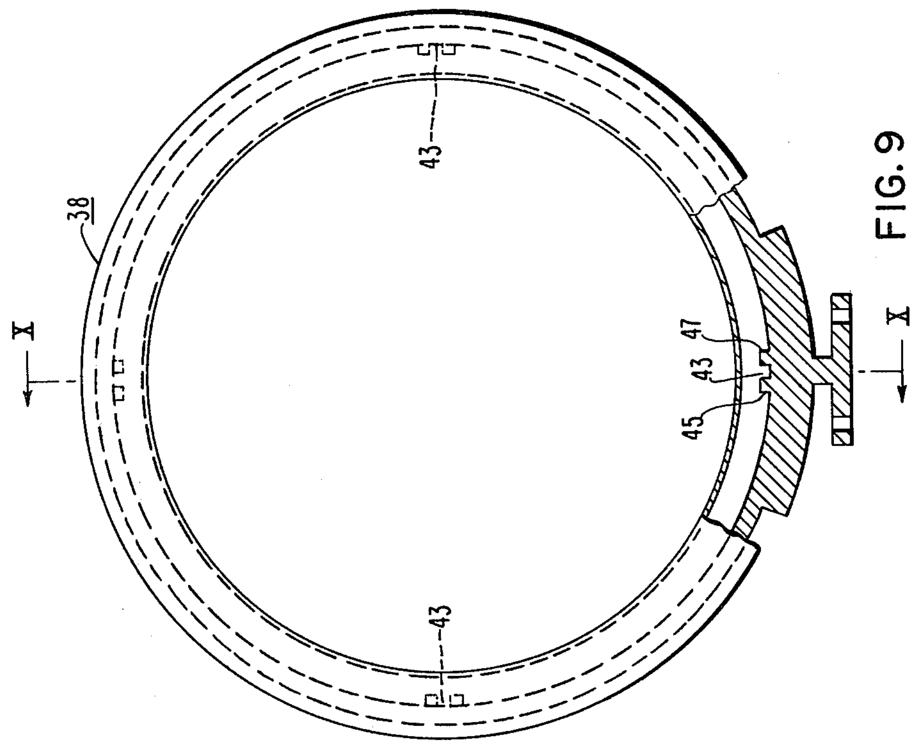

The transition duct 14 is a conventional unit having a somewhat widened upstream mouth for coupling to the relatively large diameter catalytic unit 13. A ring 38 (see also FIGS. 9 and 10) is fitted over the upstream end of the duct 14 so that four pins 41, outwardly projecting from the duct 14 and equally spaced circumferentially about the duct 14, are registered in mating axially extending and radially inward facing slots 43 on the ring 38. The slots 43 are formed by ribs 45, 47 which project radially inwardly from an inner side of the ring 38 and extend in the axial direction. The downstream inner surface of the ring 38 rests on spring fingers on an annular spring clip assembly 48 having an annular base portion 50 welded to the duct 14. When the ring 38 is properly placed on the duct 14, a mounting pad 49 on the ring 38 is located for rigid securance by bolts or other means to a pad 51 on the turbine casing.

The ring 38 is provided with an annular flange 53 having a radially outward projecting annular rim portion 55 for indexed engagement in a radially inward annular slot 57 provided in the catalytic clam shell housing 34. The flange 43 also has a radially inward projecting annular portion 59 which is provided at its inner extent with an axially extending ring lip 60. As such, the extended lip 60 is spaced radially inwardly from the duct 14 and extends downstream so as to terminate within the duct 14. A resultant annular channel 62 thus can provide coolant flow from the duct exterior into the duct 14 as a film along the inner duct wall surface when the spring clip assembly 48 is structured to provide a coolant flow inlet.

The clam shell 34 is formed from like upper and lower half housing bolted together as indicated at 83 along a horizontal flanged joint 81. The assembled clam shell is provided with a radially outward projecting annular flange 64 which is provided with the inwardly facing annular slot 57 for duct ring support. Lugs 59 integral to the flange 64 provide inwardly facing and circumferentially spaced slots 66 for catalytic can support.

Figure 11:
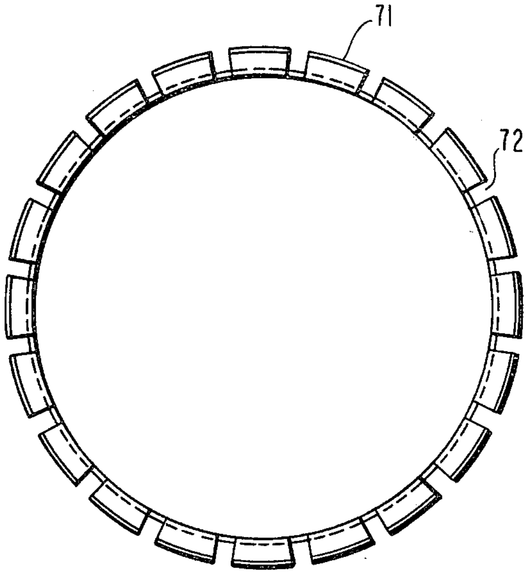
FIGS. 11 and 12 show an end view and a partially sectioned elevational view of a spring clip ring for support of the catalytic unit.
Figure 12:
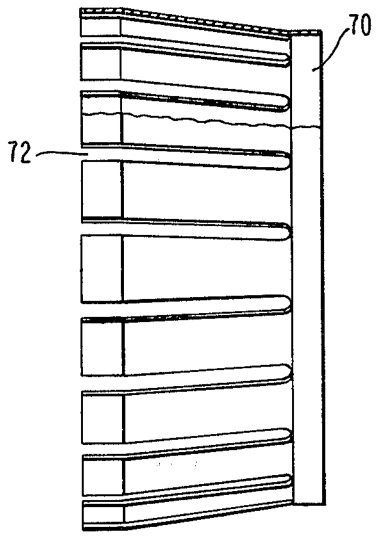
Figure 13:
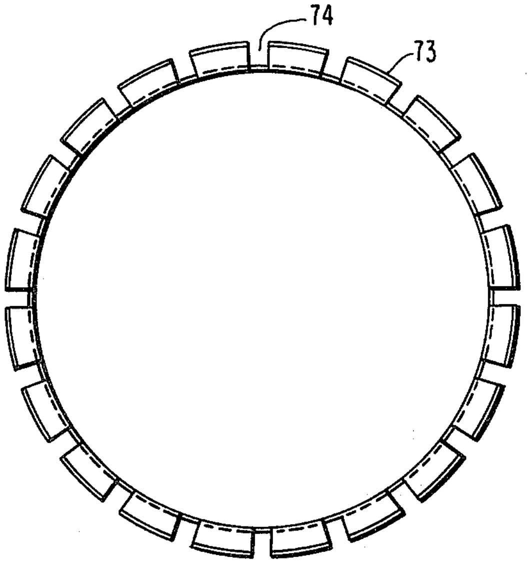
FIG. 13 shows an end view of another spring clip ring employed for catalytic unit support.
Figure 14:
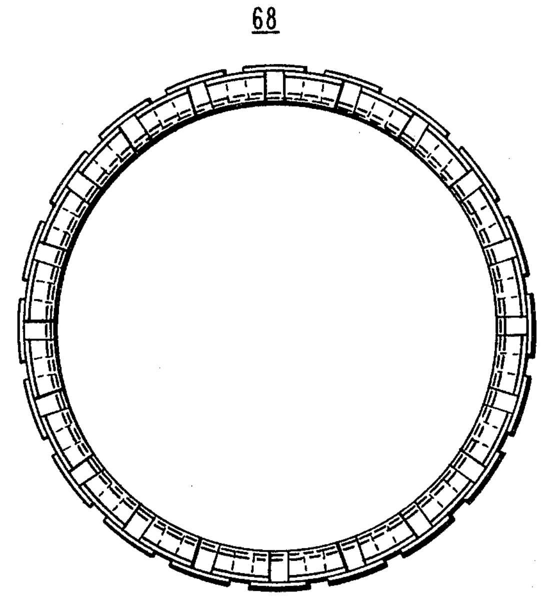
FIGS. 14 and 15 show end and elevational views of an assembly of the spring clip rings of FIGS. 11 and 13 used to support the catalytic unit on the combustor.
Figure 15:
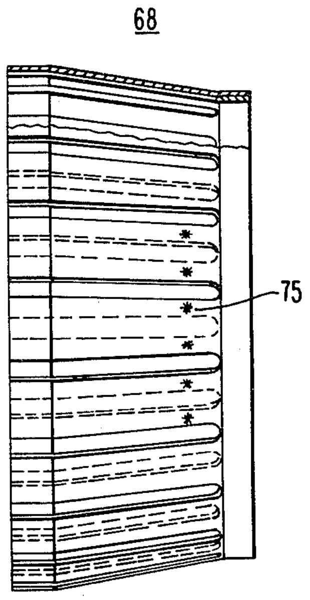
Figure 16:
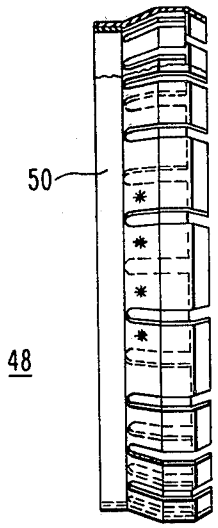
FIG. 16 shows an elevational view of another spring clip ring employed support of the catalytic unit on the transition duct.

An upstream end of the clam shell housing 34 is supported by an annular spring clip assembly 68 having a base portion 70 welded to a peripheral end shoulder on the combustor basket diffuser 24. The spring clip assembly 68 is formed from an outer spring ring 71 (FIGS. 11 and 12) which fits tightly over an inner spring ring 73 (FIG. 13). Slots 72 are spaced about the outer spring ring 71 and extend from the upstream edge in the axial direction into the spring ring base portion 70. Similar slots 74 are provided in the inner spring ring 73, but the slots 74 are circumferentially displaced from the slots 72 so that the spring assembly as a whole provides spring finger support for the clam shell housing 34 while substantially sealing the basket-catalyst housing joint against entry of external air. Securance of the spring clip assembly 68 (FIGS. 14 and 15) to the diffuser 24 is provided by inner ring spot welds indicated representatively by the reference character 75.

Figure 2:
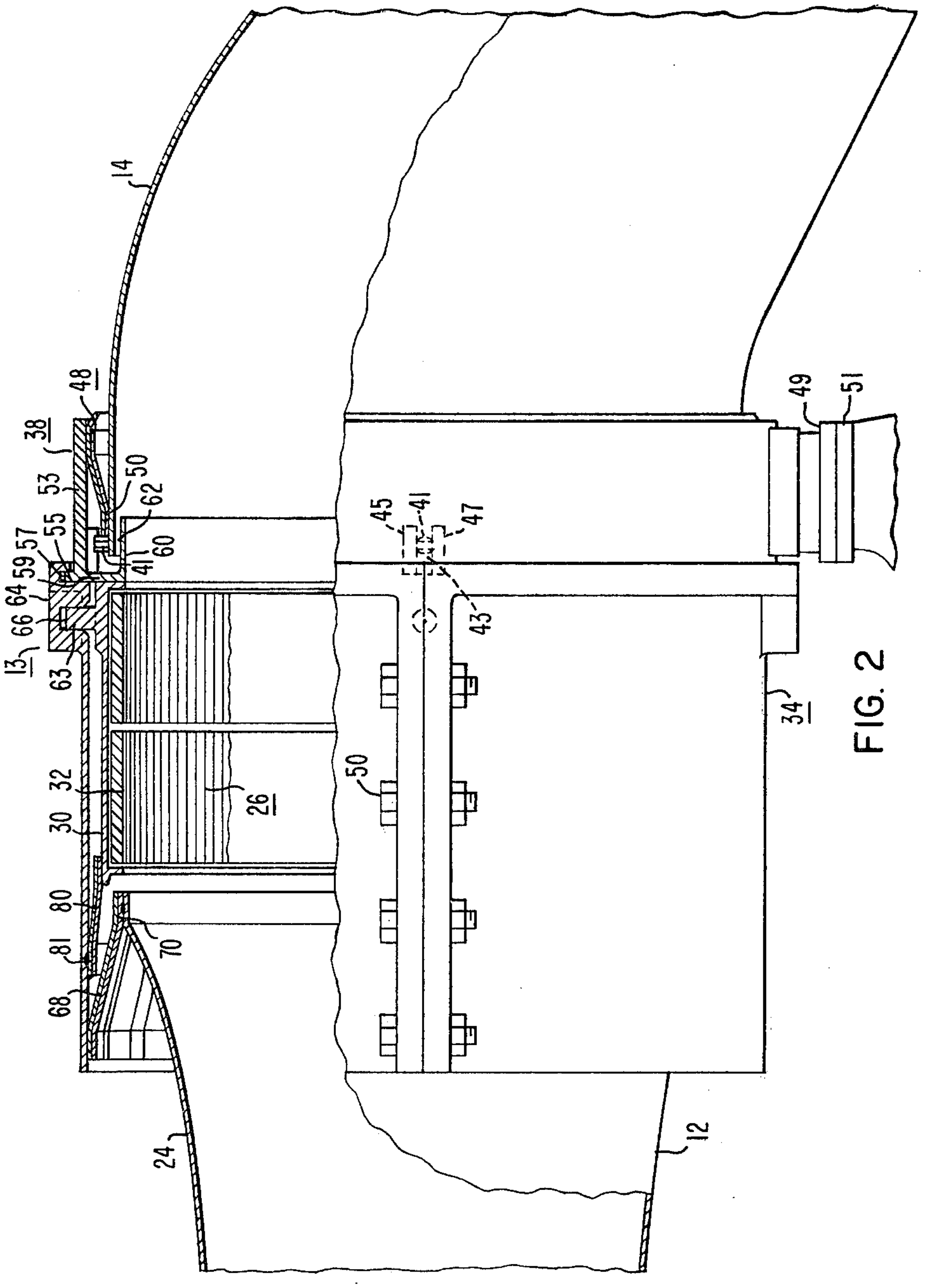
FIG. 2 shows an enlarged elevational and partially sectioned view of a combustor basket and a catalytic unit included in FIG. 1.
Figure 7:
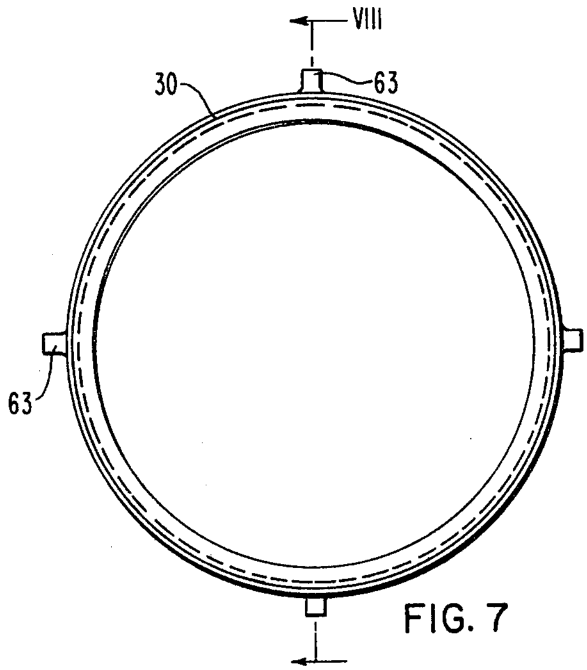
FIGS. 7 and 8 show an end and elevational section views of a catalytic element support can which is supported within the shell housing.
Figure 8:
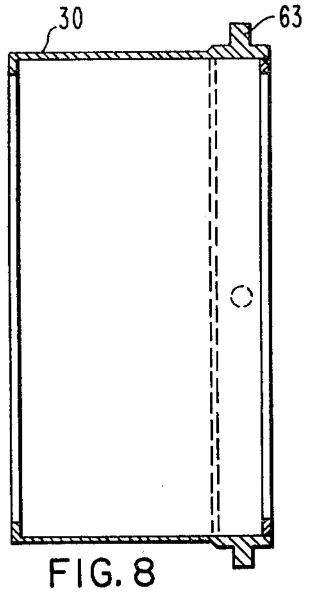
Figure 3:
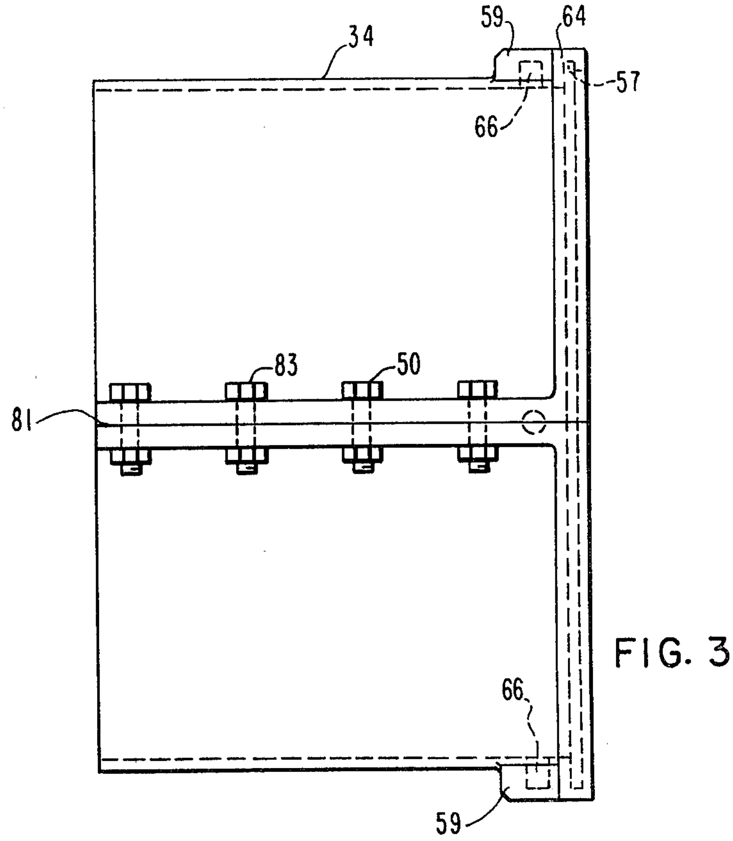
FIG. 3 shows a further enlarged elevational view of the catalytic unit and its support structure.
Figure 4:
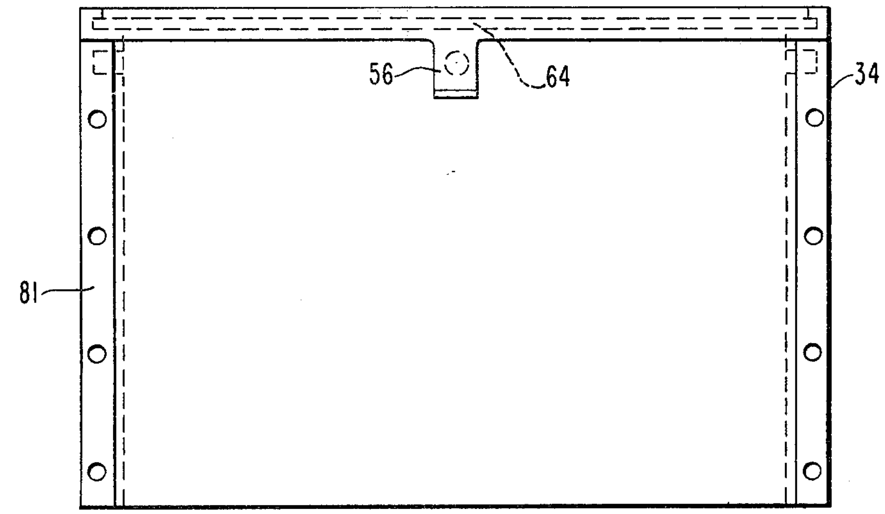
FIGS. 4 and 5 show a top view and an upstream end view of a housing shell included in the catalytic element supported assembly.
Figure 5:
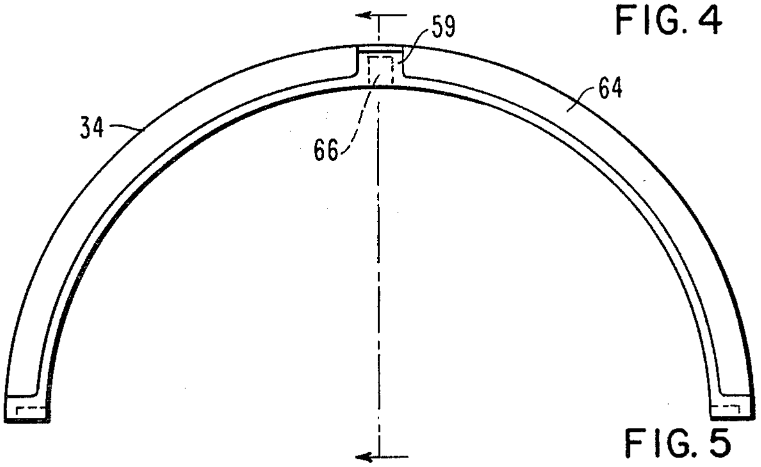
Figure 6:
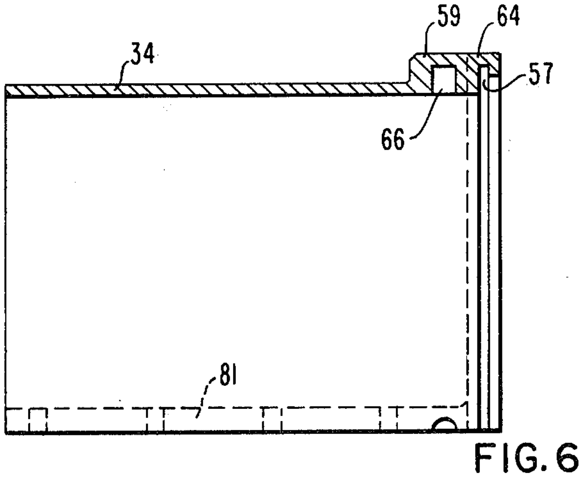
FIG. 6 shows a partial view of an elevational section of the housing shell.

Another similar spring clip ring assembly 80 (FIG. 2) has a base portion 81 welded to the inner surface of the clam shell housing 34. Spring fingers extend inwardly along the downstream direction to support circumferentially a free upstream end portion of the catalytic can 30. The catalytic can is provided with a downstream end portion having a radially outward projecting rim lugs 63 which fit into the clam shell slots 66. Since the clam shell housing is provided in halves, the spring clip assembly 80 is also provided in corresponding halves. The duct spring clip assembly 48 and the spring clip assembly 80 both can have a general design of the type employed for the ring assembly 68.

In the assembled structure, the thrust load caused by the pressure drop across the catalytic element 26 is carried to the duct ring 38 and transmitted to the casing mount 49, 51. The spring support relationship between the combustor basket 12 and the catalytic unit 13 and between the catalytic unit 13 and the transition duct 14 provides for relative axial sliding movement of the basket, catalytic unit and duct is needed to accommodate axial expansion with operating temperature increases.

Since the combustor and catalytic units are separate, these units can be readily installed and removed separately through the turbine casing access holes 15. Thus, the duct 14 and the combustor 12 can first be installed. The ring 38 is next placed over the duct 13 and mounted on the pad 51. The bottom half of the clam shell 34 is fitted onto the ring rim 55 and rotated to the bottom of the catalyst unit space. Next, the catalyst can 30 with the element 26 is inserted with its lugs 63 in the slots 66 of the bottom clam shell half. The upper clam shell half is then placed over the lower clam shell half with its slots 66 engaged with the can lugs 63 and with its half of the spring clip assembly 80 resting on the upstream end of the can 30. The clam shell halves are bolted together and the assembly is completed. Disassembly is executed in the reverse order.

In the case of integrated combustion and catalytic units, the resultant weight and size make casing access hole entry very difficult or impossible. The separately assembled structure disclosed herein thus lends itself to both new turbine applications as well as retrofit applications.

Similarly, periodic replacement of catalytic elements due to catalyst degradation with time is facilitated as a result of the disclosed structural arrangement.

What is claimed is:

1. A catalytic combustion system for a stationary combustion turbine having a casing comprising a supported combustor basket having means for burning primary fuel to provide a preheated gas, means for mixing secondary fuel and air with the preheated gas, a transition duct disposed downstream from said combustor basket, means for supporting said duct relative to the turbine casing, a catalytic unit, means for supporting said catalytic unit relative to an upstream portion of said transition duct to put the thrust load from said catalytic element on said duct supporting means, and means for coupling an outlet portion of said combustor basket to an inlet of said catalytic unit.

2. A catalytic combustion system as set forth in claim 1 wherein means are provided for spring supporting said catalytic unit relative to said duct in sliding engagement to provide for relative axial thermal growth of the combustion system.

3. A combustion system as set forth in claim 1 wherein means are provided for spring supporting said catalytic unit relative to said combustor basket in sliding engagement to provide for relative axial thermal growth of the combustion system.

4. A combustion system as set forth in claim 3 wherein means are provided for spring supporting said catalytic unit relative to said duct in sliding engagement to provide for relative axial thermal growth of the combustion system.

5. A catalytic combustion system as set forth in claim 4 wherein said catalytic unit comprises a catalytic element and a support assembly having at least two housing parts secured together about said catalytic element, and means for engaging said catalytic support assembly with said transition duct and said combustor basket.

6. A catalytic combustion system as set forth in claim 5 wherein said catalytic element has a housing can, said housing parts and said can having slot and rim structure extending in the circumferential direction with interfitting occurring in the radial direction.

7. A combustion system as set forth in claim 6 wherein spring ring means are provided for supporting one end of said cam relatively to said housing and said interfitting rim and slot structure is located to support the other end of said can.

8. A combustion system as set forth in claim 4 wherein duct ring means supports said catalytic unit relative to said duct, means for supporting said ring means relative to said unit against relative axial movement, spring ring means for supporting said ring means on said duct for relative axial sliding movement, and means for rigidly supporting said ring means relative to the turbine casing.

9. A combustion system as set forth in claim 8 wherein spring ring means are provided for supporting said catalytic unit on said combustor basket for relative axial sliding movement.

10. A combustion system as set forth in claim 8 wherein cooperative means are provided on said duct ring means and said duct to provide a coolant channel for directing external coolant between said duct and said ring means along the inner surface of said duct in the downstream direction.

11. A combustion system as set forth in claim 8 wherein said duct ring means and said catalytic unit have interfitting slot and rim structure extending in the circumferential direction with interfitting occurring in the radial direction.

* * * * *